United States Patent
Menzel

(12) 
(10) Patent No.: US 6,434,678 B1
(45) Date of Patent: Aug. 13, 2002

(54) METHOD FOR DATA STORAGE ORGANIZATION

(75) Inventor: Uwe Menzel, Zeuthen (DE)

(73) Assignee: GTP, Inc., Falls Church, VA (US)

( * ) Notice: Subject to any disclaimer, the term of this patent is extended or adjusted under 35 U.S.C. 154(b) by 0 days.

(21) Appl. No.: 09/337,305

(22) Filed: Jun. 21, 1999

Related U.S. Application Data

(60) Provisional application No. 60/119,827, filed on Feb. 12, 1999.

(51) Int. Cl.[7] .............................................. G06F 12/00
(52) U.S. Cl. ....................................... 711/156; 710/205
(58) Field of Search ................................ 711/154, 165, 711/153, 156, 170, 173, 141, 159, 161; 707/200, 205

(56) References Cited

U.S. PATENT DOCUMENTS

| | | | |
|---|---|---|---|
| 3,936,690 A | | 2/1976 | Salgo .......................... 313/392 |
| 4,213,192 A | | 7/1980 | Christensen, Sr. .......... 365/118 |
| 4,566,937 A | | 1/1986 | Pitts ............................ 156/628 |
| 4,668,609 A | | 5/1987 | Seiwatz ....................... 430/296 |
| 4,744,636 A | | 5/1988 | Haven et al. ........... 350/331 R |
| 4,760,567 A | | 7/1988 | Crewe ......................... 369/101 |
| 4,764,818 A | | 8/1988 | Crew ........................... 358/347 |
| 4,961,178 A | | 10/1990 | Matsuda et al. ............. 369/103 |
| 4,982,362 A | | 1/1991 | Comberg et al. ............ 365/118 |
| 5,270,995 A | | 12/1993 | Wada et al. ................. 369/101 |
| 5,581,723 A | * | 12/1996 | Hasbun et al. .............. 711/103 |
| 5,586,285 A | * | 12/1996 | Hasbun et al. .............. 395/430 |
| 5,604,900 A | * | 2/1997 | Iwamoto et al. ............ 395/621 |
| 5,664,189 A | * | 9/1997 | Wilcox et al. .............. 395/621 |
| 5,802,600 A | * | 9/1998 | Smith et al. ................. 711/173 |
| 5,806,072 A | * | 9/1998 | Kuba et al. .................. 707/200 |
| 5,812,817 A | * | 9/1998 | Hovis et al. ........... 395/497.04 |
| 5,930,815 A | * | 7/1999 | Estakhri et al. ............. 711/103 |
| 6,000,005 A | * | 12/1999 | Yamada ....................... 711/103 |
| 6,145,066 A | * | 11/2000 | Atkin .......................... 711/165 |

OTHER PUBLICATIONS

Chang, T.H.P. et al., "Arrayed miniature electron beam columns for high throughput sub–100 nm lithography," *J. Vac. Sci. Technol. B*, 1992, 10(6), 2743–2748.

Hoffman, A. et al., "Surface and subsurface 1 KeV electron stimulated reduction of sapphire studied by electron spectroscopy," *Appl. Surface Scie.*, 1996, 93, 301–308.

(List continued on next page.)

*Primary Examiner*—Mathew Kim
*Assistant Examiner*—Christian P. Chace
(74) *Attorney, Agent, or Firm*—Woodcock Washburn LLP

(57) ABSTRACT

A method for fast, high-density data storage in a data storage device having plural storage sections that includes overwriting and reformatting of entire storage sections, each having a large storage capacity. New or changed data is written continuously on free storage sites of a particular storage section until it is filled. Data from the newly-filled section is restructured and copied to a target section. Additional data is then stored onto a second storage section while the first storage section is restructured and copied. The previously-filled section may be reformatted to store new data after the second storage section is filled with data. The process may be repeated to allow for continuous data storage.

22 Claims, 4 Drawing Sheets

OTHER PUBLICATIONS

Humphreys, C.J. et al., "100 KeV electron beam damage of metals, ceramics and semiconductors—implications for microanalysis and nanolithography," *Inst. Phys. Conf. Ser.*, Paper presented at EMAG 91, Bristol, Sep. 10–13, 1991, No. 119, Section 8, 319–324.

Kirkpatrick, C.G. et al., "Information–storage device using surface diodes," *Appl. Physics Lett.*, 1977, 30(11), 592–594.

Lyding, J.W. et al., "Nanometer scale patterning and oxidation of silicon surfaces with an ultrahigh vacuum scanning tunneling microscope," *J. Vac. Sci. Technol. B*, 1994, 12(6), 3735–3740.

Neidhart, T. et al., "Determination of electron–induced total sputter yield of LiF," *Nucl. Instrum. and Methods in Phys. Res. B*, 1995, 101, 127–130.

Orloff, J., "High–resolution focused ion beams," *Rev. Sci. Intrm.*, 1993, 5, 1105–1130.

Tremsin, A.S. et al., "The Microsphere Plate: a new type of electron multiplier," *Nucl. Instrum. and Methods in Phys. Res. A*, 1996, 368, 719–730.

Valyaev, A.N., "Mechanisms of brittle fracture of solids exposed to intense–pulsed–electron–beams," *Nucl. Instrum. and Methods in Phys. Res. B*, 1998, 141, 555–561.

* cited by examiner

METHOD FOR DATA STORAGE ORGANIZATION

CROSS-REFERENCE TO RELATED APPLICATIONS

The present application claims the benefit of U.S. Provisional Patent Application No. 60/119,827, filed Feb. 12, 1999, entitled "METHOD FOR DATA STORAGE ORGANIZATION." This Application claims benefit of U.S. provisional Application Serial No. 60/119.827 filed Feb. 12, 1999.

FIELD OF THE INVENTION

The present invention relates to a method of data storage. In particular, the present invention relates to a method of storing data in which data is written continuously to a section of a storage medium until the storage capacity of the section is reached. Additional data is written to a next section of the medium while the data in the now-filled section is restructured into a target section. The previously-filled section is then initialized such that data may again be written thereto.

BACKGROUND OF THE INVENTION

Information storage and retrieval has become immensely important as a result of the increased need for information exchange in the modern, high technology society of today. The rapidly growing urge for increased access to information has spurred the development of ever larger and faster data storage and retrieval systems. Many forms of data storage and retrieval systems are utilized to date, however, all data storage systems are designed to store and overwrite each bit individually, or to write only once to the storage medium. These limitations significantly restrict the spectrum, access speed, and therefore the performance of uniquely different data storage arrangements.

In view above, and the increasing demand for data storage and fast retrieval, there is a need for a method of data storage that overcomes the limitations of the prior art by providing for higher data density and faster data access. The present invention provides such a method.

SUMMARY OF THE INVENTION

The present invention describes an organization method for data storage that is applicable to data storage devices that have a high data storage density and fast access speeds. The design is based on a technique that does not revise data sets in a bit-by-bit manner, but rather it stores modifications to written data in free storage space and updates entire sections of large bit quantities all at once. This block update method requires a system of two or more storage sections that will simultaneously store, restructure, organize, and copy data, allowing a continuous flow of data to be stored or retrieved. The method of the present invention enables the development of uniquely different data storage methods and devices with extremely fast access speed and high storage density.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like reference numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

The present invention is directed to a method of data organization, storage, and retrieval utilizing at least two similar data storage sections. The present method is preferably implemented in a data storage device, such as that disclosed in U.S. patent application Ser. No. 09/337,148, entitled, "Method and Device For Charged Particle Ray Information Storage," filed Jun. 21, 1999, the disclosure of which is incorporated herein by reference in its entirety.

Figure 1:
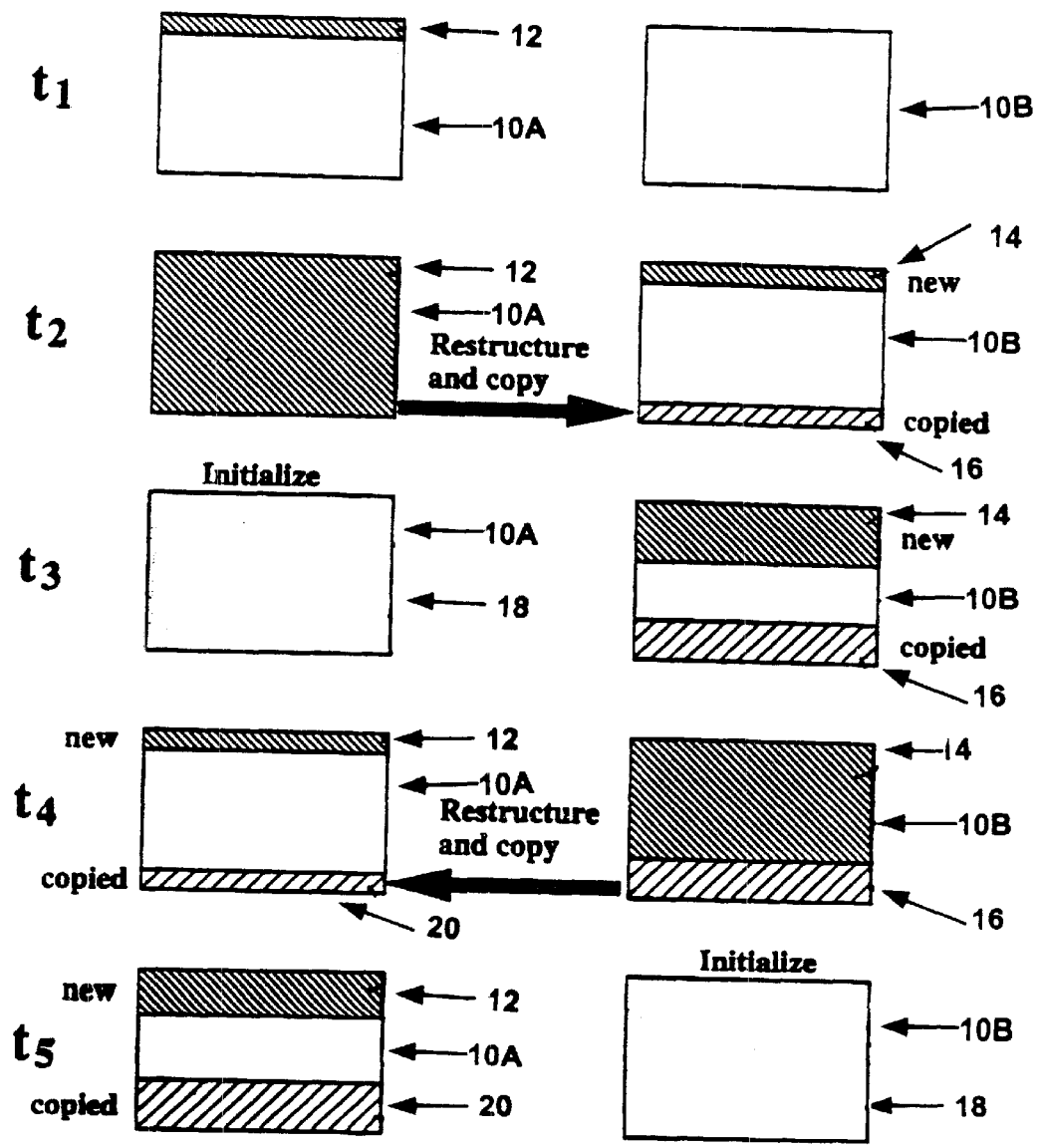
FIG. 1 illustrates the data storage organization method of the present invention for a two-section storage system.

Referring now to FIG. 1, there is illustrated the processes performed in the method for data organization, storage and retrieval, utilizing two similar data storage sections 10A and 10B. The method of data storage is performed as follows: new, changed or modified data 12 is written continuously into storage section 10A, as shown in time frame $t_1$. When storage section 10A reaches a predetermined capacity (e.g., approximately all of the available capacity), additional data 14 continues to be stored from top to bottom in storage section 10B, while the stored data on storage section 10A is restructured and copied into storage section 10B, from bottom to top, as shown in time frame $t_2$ as data 16.

The data 12 is restructured by evaluating the data 12 to eliminate all of modifications, deletions, etc. performed on the files that comprise the data 12 such that the data 16 written to the storage section 10B contains only unique occurrences of each distinct file stored in data 12. For example, if a file name "file.doc" is modified by a user and saved four times within the data 12, only the most recent version of file.doc will be restructured into data 16. Similarly, if "file.doc" was deleted, it would not be restructured into data 16.

Figure 2:
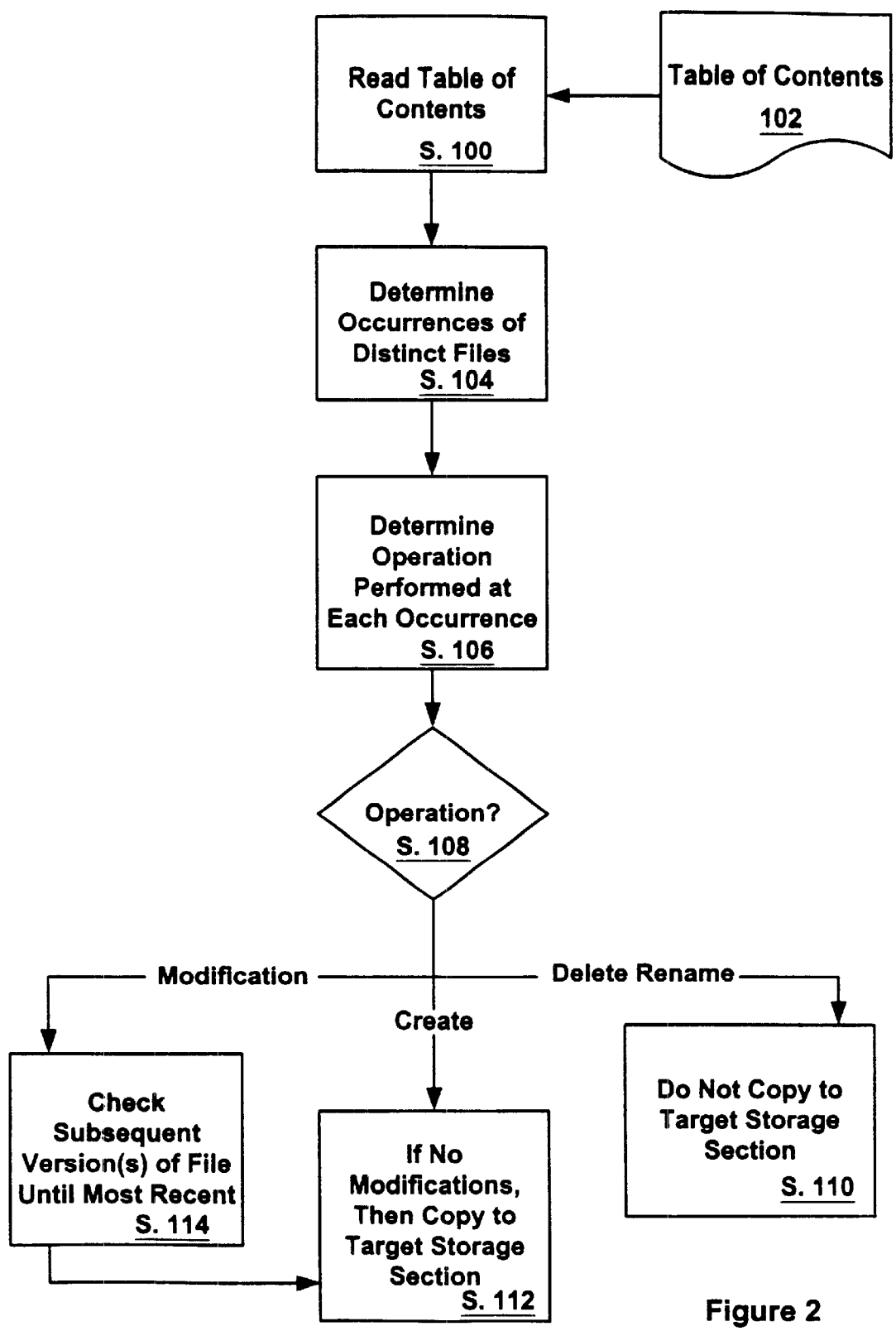
FIG. 2 is a flow chart that illustrates the process of restructuring data from a first storage section to a second storage section.

Referring to FIG. 2, there is illustrated the restructuring procedure in accordance with the present invention. The procedure begins (S.100) when a file allocation table or table of contents 102 is read to determine the contents thereof. The table of contents 102 is preferably maintained at the beginning of each storage section 10. The table of contents 102 is traversed to determine all occurrences of distinct files (S.102) and an operation performed on the file (e.g., access, modify, delete, rename, etc.) at each occurrence (S.104). Next, the type of operation for each file occurrence is determined (S.108). If the operation was a delete or modify, then the file is not copied over to the target storage section (e.g., 10B). If the operation was a file creation operation and no other modifications were made to the file, then it is copied to the target storage section. If the operation was a modification, then it is determined if subsequent modifications were made to the file, and if so, only the most recent version is copied to the target storage medium. In accordance with the process of FIG. 2, stored data is accessed in individual blocks and not on a bit-by-bit basis, which advantageously speeds the processing of the data.

Returning again to FIG. 1, after the data 12 of storage section 10A has been restructured and copied into storage section 10B (i.e., the target storage section) as data 16, storage section 10A is initialized (time frame t3) 18 by reformatting the section. In accordance with the device disclosed in U.S. patent application Ser. No. 09/337,148, the section of the storage medium may be formatted by inducing a structural phase transition in the section, such as a change in morphology, topography, composition, defect concentration or adsorbing bonding characteristics under the influence of the particle ray at recording parameters. Storage section 10A must be refreshed before the data 14 written to storage section 10B reaches a predetermined level of capacity, at which time new data 12 continues to be stored in storage section 10A, top to bottom, while the data of section 10B is restructured and copied into storage section 10A, bottom to top (time frame t4). Storage section 10B is then initialized as noted above (time frame t5). This cycle can then start over so that continuous data storage can be achieved.

Figure 3:
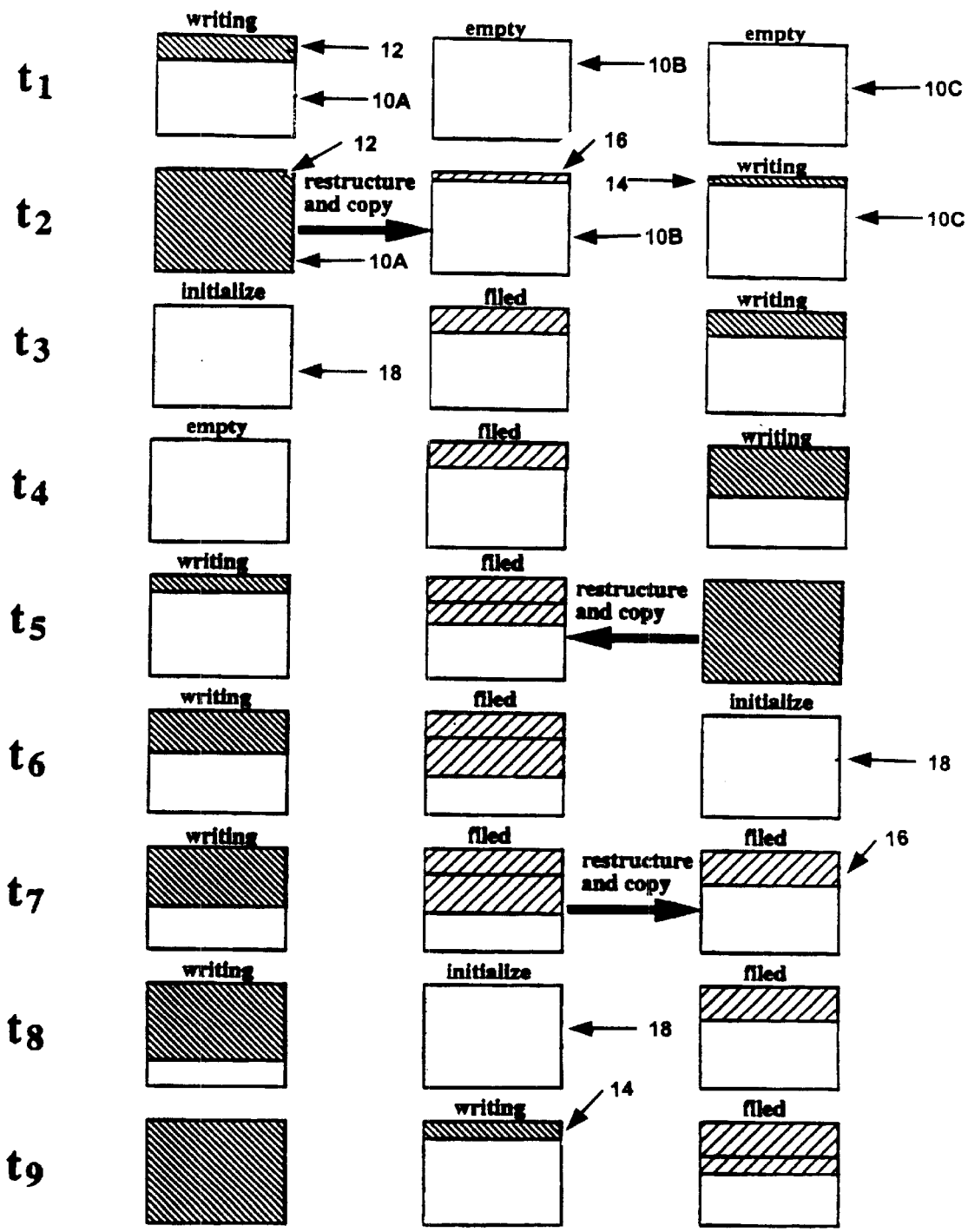
FIG. 3 illustrates the data storage organization method of the present invention for a three-section storage system.

FIG. 3 shows the process of data storage and retrieval, utilizing three similar data storage sections 10A, 10B and 10C. The method of data storage proceeds as follows: new, changed or modified data 12 is written continuously into storage section 10A, as shown in time frame $t_1$. When amount of data in storage section 10A reaches available of capacity, additional data 14 continues to be stored in storage section 10C, while the stored data on storage section 10A is restructured and copied into storage section 10B, as shown in time frame $t_2$ as data 16. The reorganization may be performed in accordance with the procedure of FIG. 2.

After the data 12 of storage section 10A has been restructured and copied into storage section 10B, storage section 10A is reformatted (time frame $t_3$) 18 before storage section 10C reaches its available storage capacity (time frame $t_4$). When storage section 10C reaches this capacity, the data of section 10C is restructured 14 and copied into storage section 10B (target storage section) as data 16 (time frame $t_5$). Section 10C is then initialized (reformatted) 18 with new data 12 being continuously being stored onto storage section 10A (time frame $t_6$). Before storage section 10B is completely filled, it too may then be restructured and copied into the reinitialized empty storage section 10C (target storage section) as data 16 (time frame $t_7$). The reorganization of storage area 10B is also performed in accordance with FIG. 2. This is followed by an initialization of storage section 10B (time frame $t_8$) which allows for writing of data 14 onto this storage section as shown in time frame $t_9$.

A variety of combinations can be imagined for the use of three independent storage sections. For example data can be written alternating onto storage sections 10A and 10C while restructured data will always be copied back into storage section 10B for permanent storage.

Figure 4:
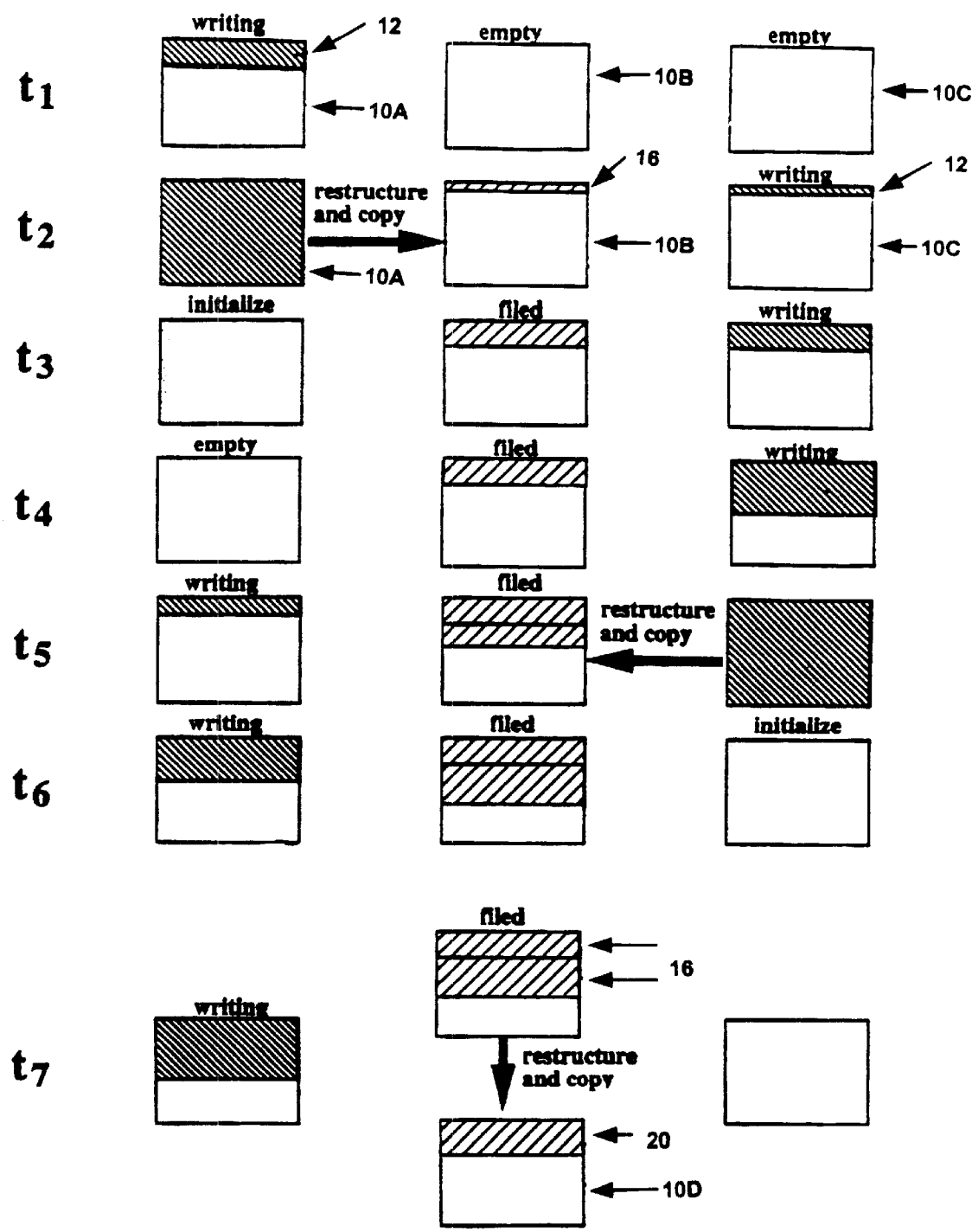
FIG. 4 illustrates the data storage organization method of the present invention for a four-section storage system.

FIG. 4 shows the process of data storage and retrieval utilizing four similar data storage sections 10A–10D. The method of data storage is performed as follows: new, changed or modified data 12 is written continuously and alternating onto storage sections 10A and 10C, while data 16 marked for permanent storage is stored onto storage section 10B, as described in the example of FIG. 3 (see, time frames $t_1$–$t_6$). Data is written onto either storage section 10A or 10C, while the other of storage section 10C or 10A is reinitialized 18. In addition to the process as described in FIG. 3, the data 16 stored onto section 10B is restructured at time $t_7$ and stored onto storage section 10D (target storage section) as data 20. Storage section 10B is then reinitialized and can be utilized for transfer for data from sections 10A and 10C. Optionally, the functions of storage sections 10B and 10D can be reversed, such that restructured data from storage sections 10A and 10C will be copied into storage section 10D until storage section 10D is restructured and transferred back onto storage section 10B (target storage section).

In each data storage section the data is stored in a linear fashion, and subsequent data blocks are stored in subsequent areas of the data storage section. The wording "top to bottom" and "bottom to top" in the above described data storage method is used illustratively for any two clearly distinguishable and dividable storage allotments and formats. For example, data may be written from "left to right" or "right to left."

For continuous high data rate information storage and retrieval, the method of the present invention for data storage and retrieval wherein two similar data storage sections 10 are provided requires that each storage section 10 is equipped with at least two parallel and independent read and write mechanisms. Similarly, for three or more similar data storage sections, the method for data storage and retrieval may be operated with one or more read and write mechanisms for each storage section. An increasing number of storage sections and number of read and write mechanisms for each section will lead to a higher degree of parallel processing and accelerate the data access and process speed.

The organization method for data storage and retrieval of the present invention enables the development of fundamentally new data storage devices, in which the mechanism of data storage does no longer require the reversal of individual bits. Data organized in a block method is written and retrieved with much higher speed. The slow process of deleting data is accomplished by reinitializing entire storage sections that are not immediately utilized to write data. The larger the storage capacity, the more beneficial this method is in comparison to conventional bit-by-bit methods. Using current state-of-the-art technology storage densities approaching $10^{13}$ bits/inch$^2$ and data access times of 1 ns are possible. Considering that the size of each of the above described storage sections 10 is approximately 1 inch$^2$, it will take 10000s, or nearly 3 hours, at full data rate of 1 GHz (Gigahertz) to fill one section. Thus, in a 24-hour period at a data rate of 1 GHz, no storage section 10 needs to be restructured and copied more than 4 times, while nearly $10^{14}$ bits will have been stored.

In view of the above detailed description, various other modifications and variations will now become apparent to those skilled in the art. It is intended that the present invention of the appended claims cover all reasonable modifications and variations without departing from the spirit and scope of the invention. In particular, more than four storage sections may be employed and the process of writing and restructuring between storage sections may be varied, but remain within the scope of the appended claims.

What is claimed is:

1. A method of data storage in a device including a storage medium having at least two storage sections, comprising:

writing data in a first storage section until said first storage section is filled to a predetermined capacity;

writing data in a second storage section after said first storage section is filled to said predetermined capacity;

determining occurrences of distinct data files within said data in said first storage section and evaluating said occurrences to eliminate non-unique occurrences of each distinct data file within said data of said first storage section; and ascertaining a most recently updated occurrence of each data file and copying said most recently updated occurrence as a first restructured data to a target storage section, as a function of said filling of said first storage section to said predetermined capacity.

2. The method as recited in claim 1, wherein said target storage section is said second storage section, and said first restructured data is copied into said second storage section, and wherein said method further comprises:

initializing said first storage section;

writing said data in said second storage section in a first direction, wherein said first direction is one of top-to-bottom and bottom-to-top, until said second storage section is filled to said predetermined capacity;

determining occurrences of distinct data files within said data in said second storage section and evaluating said occurrences to eliminate non-unique occurrences of each distinct file of said data of said second storage section;

ascertaining a most recently updated occurrence of said data and copying said most recently updated occurrence as second restructured data when said second storage section is filled to said predetermined capacity, and copying said second restructured data into said first storage section in a second predetermined direction, wherein said second direction is one of bottom-to-top and top-to-bottom, while new and modified data is stored in said first storage section in said first predetermined direction.

3. The method as recited in claim 2, wherein said first predetermined direction is from a top to a bottom of a respective storage section, and wherein said second predetermined direction is from said bottom to said top of said respective storage section.

4. The method as recited in claim 2, further comprising initializing said second storage section and repeating said method of data storage to store additional data.

5. The method as recited in claim 1, wherein individual bits comprising said data in a storage section are not overwritten when data is modified or deleted.

6. The method as recited in claim 1, wherein said target storage section comprises a third storage section, and said method further comprises:

initializing said first storage section;

writing data in said second storage section until said second storage section is filled to said predetermined capacity;

determining, evaluating, ascertaining and copying said data in said second storage section into second restructured data when said second storage section is filled to said predetermined capacity, and copying said second restructured data to said third storage section while data is written to said first storage section.

7. The method as recited in claim 6, further comprising initializing said second storage section and repeating said method of data storage to store additional data.

8. The method as recited in claim 6, further comprising:

initializing said second storage section;

determining, evaluating, ascertaining and copying, at specified times, said first restructured data and said second restructured data in said third storage section into third restructured data and copying said third restructured data to said second storage section;

initializing said second third section; and exchanging the designations of said third storage section and said second storage section in said method and repeating said method of data storage to store additional data.

9. The method as recited in claim 6, further comprising:

initializing said second storage section;

determining, evaluating, ascertaining and copying, at specified times, said first restructured data and said second restructured data in said third storage section into third restructured data and copying said third restructured data to said first storage section;

initializing said third storage section; and exchanging the designations of said first storage section and said third storage section in said method and repeating said method of data storage to store additional data.

10. The method as recited in claim 6, further comprising:

initializing said second storage section;

determining, evaluating, ascertaining and copying, at specified times, said first restructured data and said second restructured data in said third storage section into third restructured data and copying said third restructured data to a fourth storage section;

initializing said third storage section;

exchanging the designations said fourth storage section and said third storage section in said method and repeating said method of data storage to store additional data.

11. The method as recited in claim 1, wherein said steps of determining, evaluating, ascertaining and copying said data of said first storage section into first restructured data and copying said first restructured data into said target storage section comprises:

reading information contained in a table of contents of said first storage section;

determining occurrences of files stored in said first storage section and an operation performed on said files;

determining a type of operation performed on a particular file of said files; and copying said particular file to said target storage section in accordance with said type of operation.

12. The method as recited in claim 11, wherein said determining a type of operation for each of said files comprises determining if said operation is one of a modify, create or a delete operation.

13. The method as recited in claim 12, wherein if said operation is a delete or modify operation, then said copying is not performed.

14. The method as recited in claim 13, wherein if said operation is a create operation and no modify operations are associated with subsequent occurrences of said particular file, then said copying is performed.

15. The method as recited in claim 13, wherein if said operation is a modify, then said method further comprises determining if subsequent modify operations were performed on said particular file, and if so, performing said copying for only the most recent version of said particular file.

16. The method as recited in claim 1, wherein said data is accessed in individual blocks.

17. The method as recited in claim 1, wherein said predetermined capacity is approximately 100 percent of an available capacity of a respective storage section at the point in time when data is initially written to said respective storage section.

18. A method of determining, evaluating, ascertaining and copying data stored in a first storage section into first restructured data and copying said first restructured data into a target storage section comprising:

triggering said restructuring of data by reaching a predetermined capacity in a first storage section;

reading information contained in a table of contents of said first storage section;

determining occurrences of files and evaluating said occurrences to eliminate non-unique occurrences of each distinct file of said data of said first storage section, and determining a most recently updated occurrence of said files stored in said first storage section and an operation performed on said files;

ascertaining a type of operation performed on the most recently updated occurrence of a particular file of said files; and copying said particular file to said target storage section in accordance with said type of operation.

19. The method as recited in claim 18, wherein said determining a type of operation for each of said files comprises determining if said operation is one of a modify, create or a delete operation.

20. The method as recited in claim 19, wherein if said operation is a delete or modify operation, then said copying is not performed.

21. The method as recited in claim 20, wherein if said operation is a create operation and no modify operations are associated with subsequent occurrences of said particular file, then said copying is performed.

22. The method as recited in claim 20, wherein if said operation is a modify, then said method further comprises determining if subsequent modify operations were performed on said particular file, and if so, performing said copying for only the most recent version of said particular file.

* * * * *